United States Patent
Joong et al.

(10) Patent No.: US 11,044,524 B2
(45) Date of Patent: Jun. 22, 2021

(54) SYSTEMS AND METHODS FOR IMPROVED AVAILABILITY FOR DTH SATELLITE BROADCASTING SERVICE USING IPTV SIGNAL SOURCE AS FALL BACK MECHANISM FOR DELIVERY

(71) Applicant: Telefonaktiebolaget LM Ericsson (publ), Stockholm (SE)

(72) Inventors: Donald Joong, Montreal (CA); Alberto Mirarchi, Montreal (CA); Adela Carmen Lebidoff, Montreal (CA)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 16/468,515

(22) PCT Filed: Dec. 16, 2016

(86) PCT No.: PCT/IB2016/057742
§ 371 (c)(1),
(2) Date: Jun. 11, 2019

(87) PCT Pub. No.: WO2018/109535
PCT Pub. Date: Jun. 21, 2018

(65) Prior Publication Data
US 2020/0077145 A1    Mar. 5, 2020

(51) Int. Cl.
*H04N 7/20*   (2006.01)
*H04N 21/442*   (2011.01)
(Continued)

(52) U.S. Cl.
CPC ... *H04N 21/44209* (2013.01); *H04N 21/4622* (2013.01); *H04N 21/6125* (2013.01); *H04N 21/6143* (2013.01)

(58) Field of Classification Search
CPC ........... H04N 21/2666; H04N 21/6143; H04N 21/64707
See application file for complete search history.

(56) References Cited

U.S. PATENT DOCUMENTS 8,897,152 B1 * 11/2014 Caceres ............ H04W 52/0229
                                                            370/252
9,907,007 B1 * 2/2018 Xue ....................... H04W 36/30
(Continued)

FOREIGN PATENT DOCUMENTS

IT     MI20130223 A1    8/2014
WO      03053050 A1    6/2003
(Continued)

OTHER PUBLICATIONS

Author Unknown, "Digital Video Broadcasting (DVB); Second generation framing structure, channel coding an modulation systems for Broadcasting, Interactive Services, News Gathering and other broadband satellite applications," European Telecommunications Standards Institute (ETSI), EN 302 307, Version 1.1.1, Mar. 2005, 74 pages.
(Continued)

*Primary Examiner* — Gigi L Dubasky
(74) *Attorney, Agent, or Firm* — Patent Portfolio Builders, PLLC

(57) ABSTRACT

Systems and methods relating to a dual-mode Set-Top Box (STB) providing improved availability of a Linear Television (LTV) channel by using an Internet Protocol (IP) Television (IPTV) service as a fallback mechanism for a Direct-To-Home (DTH) satellite service. In some embodiments, a method of operation of a dual-mode STB that consumes content from a DTH satellite system when operating in a DTH satellite mode and consumes content from an IPTV system when operating in an IPTV mode comprises consuming content on a LTV channel in the DTH satellite
(Continued)

mode and deciding whether to switch to the IPTV mode before consumption of content on the LTV channel in the DTH satellite mode is compromised. The method further comprises, upon deciding to switch modes, switching from the DTH satellite mode to the IPTV mode. The method further comprises, after switching modes, consuming content on the LTV channel in the IPTV mode.

19 Claims, 8 Drawing Sheets

(51) Int. Cl.
*H04N 21/462* (2011.01)
*H04N 21/61* (2011.01)

(56) References Cited

U.S. PATENT DOCUMENTS

| | | | | |
|---|---|---|---|---|
| 2008/0263614 | A1* | 10/2008 | Xu | H04H 60/54 725/118 |
| 2013/0094415 | A1* | 4/2013 | Ling | H04L 12/2801 370/311 |
| 2013/0169881 | A1* | 7/2013 | Kano | H04N 21/6125 348/706 |
| 2014/0208349 | A1* | 7/2014 | Nair | H04N 21/6125 725/34 |
| 2015/0040172 | A1* | 2/2015 | Zelesko | H04N 21/4622 725/110 |
| 2015/0312724 | A1* | 10/2015 | Singh | H04W 4/04 455/456.1 |
| 2016/0021424 | A1* | 1/2016 | Andersson | H04N 21/4622 725/110 |

FOREIGN PATENT DOCUMENTS

| | | | | |
|---|---|---|---|---|
| WO | WO-03053050 | A1 * | 6/2003 | ............... H04N 5/76 |
| WO | 2009114005 | A1 | 9/2009 | |
| WO | 2015017553 | A1 | 2/2015 | |

OTHER PUBLICATIONS

Author Unknown, "Digital cable," Wikipedia, The Free Encyclopedia, last modified Dec. 13, 2016, retrieved Jun. 6, 2019 from https://web.archive.org/web/20161217171146/https://en.wikipedia.org/wiki/Digital_cable, 3 pages.

Author Unknown, "Internet," Wikipedia, The Free Encyclopedia, last modified Dec. 12, 2016, retrieved Jun. 6, 2019 from https://web.archive.org/web/20161216051155/https://en.wikipedia.org/wiki/Internet, 24 pages.

Author Unknown, "IPTV," Wikipedia, The Free Encyclopedia, last modified Dec. 9, 2016, retrieved Jun. 6, 2019 from https://web.archive.org/web/20161214074933/https://en.wikipedia.org/wiki/IPTV, 17 pages.

Author Unknown, "Satellite television," Wikipedia, The Free Encyclopedia, last modified Dec. 11, 2016, retrieved Jun. 6, 2019 from https://web.archive.org/web/20161214072138/https://en.wikipedia.org/wiki/Satellite_television, 12 pages.

Author Unknown, "Time shifting," Wikipedia, The Free Encyclopedia, last modified Sep. 26, 2016, retrieved Jun. 6, 2019 from https://web.archive.org/web/20161127053454/https://en.wikipedia.org/wiki/Time_shifting, 2 pages.

Author Unknown, "Video on demand," Wikipedia, The Free Encyclopedia, last modified Dec. 6, 2016, retrieved Jun. 6, 2019 from https://web.archive.org/web/20161213193151/https://en.wikipedia.org/wiki/Video_on_demand, 7 pages.

International Search Report and Written Opinion for International Patent Application No. PCT/IB2016/057742, dated Sep. 18, 2017, 18 pages.

* cited by examiner

SYSTEMS AND METHODS FOR IMPROVED AVAILABILITY FOR DTH SATELLITE BROADCASTING SERVICE USING IPTV SIGNAL SOURCE AS FALL BACK MECHANISM FOR DELIVERY

This application is a 35 U.S.C. § 371 national phase filing of International Application No. PCT/IB2016/057742, filed Dec. 16, 2016, the disclosure of which is incorporated herein by reference in its entirety.

TECHNICAL FIELD

The present disclosure relates to Direct-To-Home (DTH) satellite Linear Television (LTV) and, in particular, relates to using an Internet Protocol (IP) Television (IPTV) source for the LTV content as a fallback mechanism.

BACKGROUND

Direct-To-Home (DTH) satellite service for broadcast Linear Television (LTV) has proven to be technologically and commercially viable. Many service providers have deployed this technology worldwide serving billions of consumers. DTH satellite service is an excellent cost-effective way of delivering broadcast LTV content (i.e., broadcast television programming). Internet Protocol (IP) Television (IPTV) service is another technology that is sometimes used to deliver LTV content. For example, a hybrid IPTV service delivers both broadcast LTV content and IP-based LTV (e.g., multicast LTV content) and Video on Demand (VoD) content.

A hybrid Television (TV) system is a TV system that utilizes specific mediums for specific applications. For example, a hybrid TV system may use DTH satellite system (i.e., a DTH satellite medium) for broadcast LTV, Pay-Per-View (PPV), or near VoD (nVoD) applications but use an IPTV system (i.e., an IPTV medium) for on-demand services such as transactional VoD (TVoD) or subscription VoD (SVoD). Hybrid TV operators assign the specific medium to be used for their different applications based on delivery and cost efficiency.

All DTH satellite services require a direct line of sight between the Low Noise Block (LNB) connected to the Set-Top Box (STB) and the broadcasting geostationary satellite. The LNB is the receiving device mounted on the satellite dish used for reception of the signal from the geostationary satellite. In many circumstances, natural (e.g., inclement weather) or man-made obstructions may prevent a clear line-of-sight for the broadcast communication and, as a result, service is interrupted. Thus, there is a need for systems and methods that mitigate such service interruptions in a DTH satellite system.

SUMMARY

Systems and methods relating to a dual-mode Set-Top Box (STB) providing improved availability of a Linear Television (LTV) channel by using an Internet Protocol (IP) Television (IPTV) service as a fallback mechanism for a Direct-To-Home (DTH) satellite service. Embodiments of a method of operation of a dual-mode STB that consumes content from a DTH satellite system when operating in a DTH satellite mode and consume content from an IPTV system when operating in an IPTV mode are disclosed. In some embodiments, the method of operation of the dual-mode STB comprises consuming content on a LTV channel in the DTH satellite mode and deciding whether to switch from the DTH satellite mode to the IPTV mode before consumption of content on the LTV channel in the DTH satellite mode is compromised due to an actual or predicted reduction in received signal strength at the dual-mode STB from the DTH satellite system. The method further comprises, upon deciding to switch from the DTH satellite mode to the IPTV mode, switching from the DTH satellite mode to the IPTV mode. The method further comprises, after switching from the DTH satellite mode to the IPTV mode, consuming content on the LTV channel in the IPTV mode. In this manner, IPTV is utilized as a fallback mechanism for DTH satellite service without interruption prior to the consumption of the content on the LTV channel.

In some embodiments, deciding whether to switch from the DTH satellite mode to the IPTV mode comprises deciding whether to switch from the DTH satellite mode to the IPTV mode based on one or more criteria related to actual received signal strength at the dual-mode STB from the DTH satellite system. Further, in some embodiments, the one or more criteria related to the actual received signal strength at the dual-mode STB from the DTH satellite system comprises a predefined threshold, and deciding whether to switch from the DTH satellite mode to the IPTV mode based on the one or more criteria comprises deciding to switch from the DTH satellite mode to the IPTV mode if the actual received signal strength at the dual-mode STB from the DTH satellite system is less than the predefined threshold. In other embodiments, the one or more criteria related to the actual received signal strength at the dual-mode STB from the DTH satellite system comprises a predefined threshold rate of change, and deciding whether to switch from the DTH satellite mode to the IPTV mode based on the one or more criteria comprises deciding to switch from the DTH satellite mode to the IPTV mode if the actual received signal strength at the dual-mode STB from the DTH satellite system decreases at a rate that is greater than or equal to the predefined threshold rate of change.

In some embodiments, deciding whether to switch from the DTH satellite mode to the IPTV mode comprises deciding whether to switch from the DTH satellite mode to the IPTV mode based on one or more criteria related to a predicted received signal strength at the dual-mode STB from the DTH satellite system.

In some embodiments, deciding whether to switch from the DTH satellite mode to the IPTV mode comprises deciding whether to switch from the DTH satellite mode to the IPTV mode based on one or more criteria related to meteorological information for a geographic region in which the dual-mode STB is located.

In some embodiments, the method further comprises receiving metadata for the LTV channel comprising an IP address for accessing the LTV channel via the IPTV system, and switching from the DTH satellite mode to the IPTV mode comprises taking one or more actions to being receiving an IPTV stream for the LTV channel from the IPTV system using the IP address. Further, in some embodiments, receiving the metadata comprises receiving the metadata as part of an enhanced electronic programming guide.

In some embodiments, the method further comprises monitoring an actual received signal strength at the dual-mode STB from the DTH satellite system. Further, in some embodiments, deciding whether to switch from the DTH satellite mode to the IPTV mode comprises deciding whether to switch from the DTH satellite mode to the IPTV mode based on one or more criteria related to the actual received signal strength at the dual-mode STB from the DTH satellite system. In some embodiments, the method further comprises reporting the actual received signal strength at the dual-mode STB from the DTH satellite system and a geographic location of the dual-mode STB to a remote server. In some embodiments, deciding whether to switch from the DTH satellite mode to the IPTV mode comprises deciding whether to switch from the DTH satellite mode to the IPTV mode based on an instruction or information received from the remote server. Further, in some embodiments, switching from the DTH satellite mode to the IPTV mode comprises taking one or more actions to start receiving an IPTV stream for the LTV channel from the IPTV system. In some embodiments, switching from the DTH satellite mode to the IPTV mode further comprises transitioning consumption of content on the LTV channel from a received signal from the DTH satellite system to the IPTV stream for the LTV channel received from the IPTV system.

Further, in some embodiments, transitioning consumption of content on the LTV channel from the received signal from the DTH satellite system to the IPTV stream for the LTV channel received from the IPTV system comprises transitioning consumption of content on the LTV channel from the received signal from the DTH satellite system to the IPTV stream for the LTV channel received from the IPTV system such that transition of consumption of content on the LTV channel is seamless.

In some embodiments, content on the LTV channel provided by the received signal from the DTH satellite signal lags content on the LTV channel provided by the IPTV stream, and transitioning consumption of content on the LTV channel from the received signal from the DTH satellite system to the IPTV stream for the LTV channel received from the IPTV system comprises caching the IPTV stream and transitioning consumption of content on the LTV channel from a point in time in the content on the LTV channel provided by the received signal from the DTH satellite signal to a corresponding point in time in the content on the LTV channel provided by the cached IPTV stream. Further, in some embodiments, transitioning consumption of content on the LTV channel from the received signal from the DTH satellite system to the IPTV stream for the LTV channel received from the IPTV system further comprises, after transitioning consumption of content on the LTV channel from the point in time in the content on the LTV channel provided by the received signal from the DTH satellite signal to the corresponding point in time in the content on the LTV channel provided by the cached IPTV stream, speeding up consumption of the content on the LTV channel provided by the cached IPTV stream until consumption catches up to the IPTV stream.

In some embodiments, the method further comprises, while consuming content on the LTV channel in the IPTV mode, deciding whether to switch from the IPTV mode to the DTH satellite mode and, upon deciding to switch from the IPTV mode to the DTH satellite mode, switching from the IPTV mode to the DTH satellite mode. The method further comprises, after switching from the IPTV mode to the DTH satellite mode, consuming content on the LTV channel in the DTH satellite mode. Further, in some embodiments, deciding whether to switch from the IPTV mode to the DTH satellite mode comprises deciding whether to switch from the IPTV mode to the DTH satellite mode based on one or more criteria related to a stability of a received signal from the DTH satellite system. Further, in some embodiments, the one or more criteria comprises a criterion that the dual-mode STB is not to switch back to the DTH satellite mode until the received signal strength at the dual-mode STB from the DTH satellite system is greater than a predefined received signal strength threshold for longer than a predefined amount of time. In some other embodiments, the one or more criteria comprises one or more criteria based on meteorological information for a geographic region in which the dual-mode STB is located.

In some embodiments, deciding whether to switch from the IPTV mode to the DTH satellite mode comprises deciding whether to switch from the IPTV mode to the DTH satellite mode based on an instruction or information received from a remote server.

Embodiments of a dual-mode STB that consumes content from a DTH satellite system when operating in a DTH satellite mode and consumes content from an IPTV system when operating in an IPTV mode are also disclosed. In some embodiments, the dual-mode STB is adapted to consume content on a LTV channel in the DTH satellite mode and decide whether to switch from the DTH satellite mode to the IPTV mode before consumption of content on the LTV channel in the DTH satellite mode is compromised due to an actual or predicted reduction in received signal strength at the dual-mode STB from the DTH satellite system. The dual-mode STB is further adapted to, upon deciding to switch from the DTH satellite mode to the IPTV mode, switch from the DTH satellite mode to the IPTV mode. The dual-mode STB is further adapted to, after switching from the DTH satellite mode to the IPTV mode, consume content on the LTV channel in the IPTV mode.

In some embodiments, the dual-mode STB is further adapted to operate according to any one of the embodiments of the method of operation of a dual-mode STB disclosed herein.

In some embodiments, a dual-mode STB comprises a DTH module, an IPTV module, and a failover module. The failover module is operable to control the dual-mode STB to operate in a DTH satellite mode in which the dual-mode STB consumes content on a LTV channel output by the DTH module. The failover module is further operable to decide whether to switch the dual-mode STB from the DTH satellite mode to the IPTV mode before consumption of content on the LTV channel in the DTH satellite mode is compromised due to an actual or predicted reduction in received signal strength at the dual-mode STB from the DTH satellite system and, upon deciding to switch the dual-mode STB from the DTH satellite mode to the IPTV mode, control the dual-mode STB to switch to the IPTV mode in which the dual-mode STB consumes content on the LTV channel output by the IPTV module. The failover module is further adapted to, after controlling the dual-mode STB to switch to the IPTV mode, control the dual-mode STB to consume content on the LTV channel output by the IPTV module.

In some embodiments, a dual-mode STB comprises a first consuming module, a deciding module, a switching module, and a second consuming module. The first consuming module is operable to consume content on a LTV channel in the DTH satellite mode. The deciding module is operable to decide whether to switch from the DTH satellite mode to the IPTV mode before consumption of content on the LTV channel in the DTH satellite mode is compromised due to an actual or predicted reduction in received signal strength at the dual-mode STB from the DTH satellite system. The switching module is operable to, upon deciding to switch from the DTH satellite mode to the IPTV mode, switch from the DTH satellite mode to the IPTV mode. The second consuming module is operable to, after switching from the DTH satellite mode to the IPTV mode, consume content on the LTV channel in the IPTV mode.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
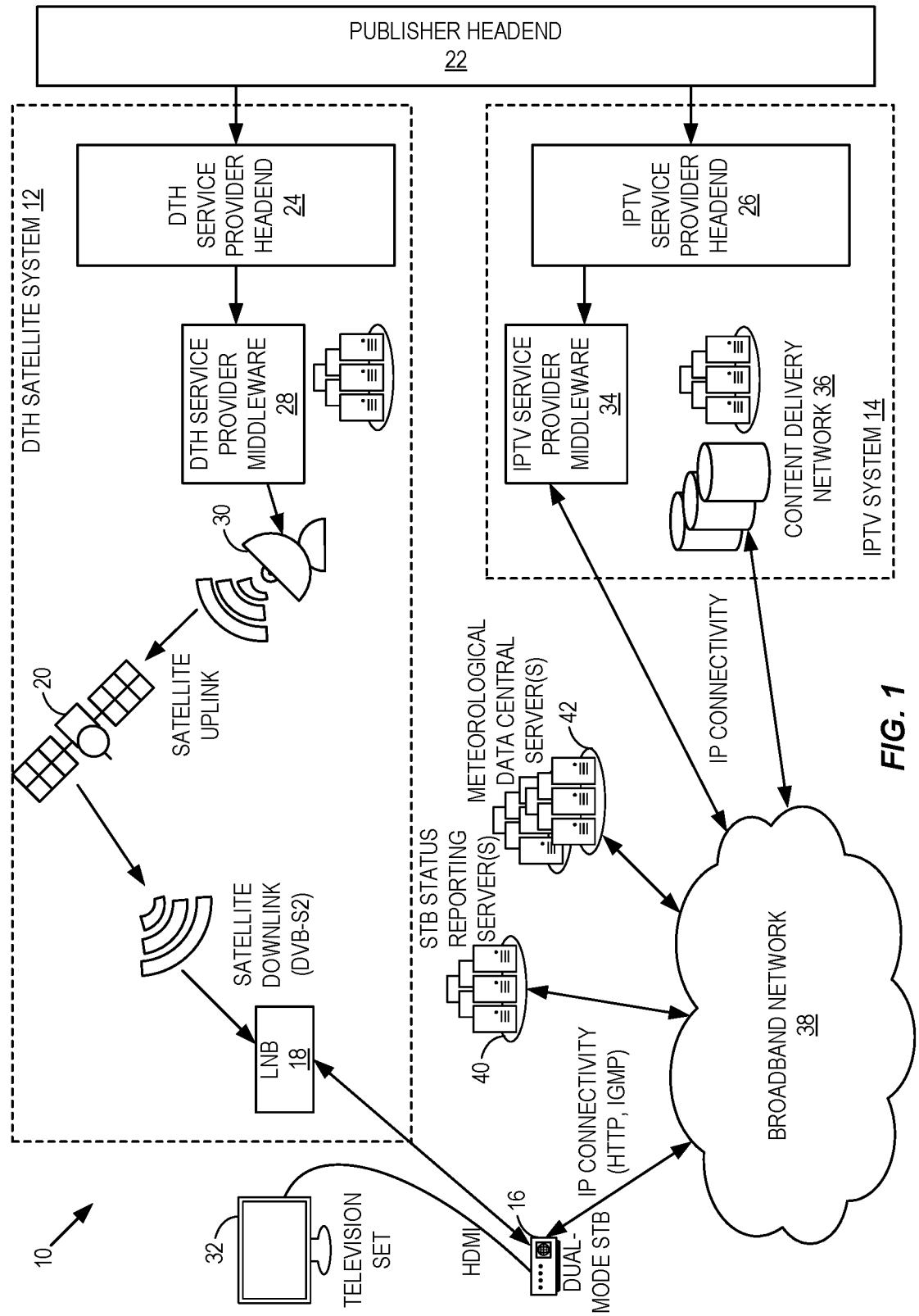
FIG. 1 illustrates a hybrid Television (TV) system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Before describing embodiments of the present disclosure, some key terms are defined as follows.

Linear Television (LTV): As used herein, LTV is a Television (TV) service where the viewer has to watch scheduled TV content (referred to herein as a linear TV content) at the particular time that it is offered and on the particular channel (referred to herein as a channel, TV channel, or LTV channel) on which it is presented. One example of a LTV service is a broadcast LTV service in which LTV content is delivered via, e.g., a Direct-To-Home (DTH) satellite system such as, for example, the DirecTV TV service or an Internet Protocol (IP) Television (IPTV) service such as, for example, AT&T U-Verse.

LTV Content: As used herein, LTV content is TV content (i.e., audio-video content) provided on a LTV channel.

DTH Satellite System: As used herein, a DTH satellite system is a system providing a DTH satellite service, where a DTH satellite service is a TV service in which broadcast LTV content is delivered by means of signals transmitted from direct-broadcast satellites.

IPTV System: As used herein, an IPTV system is a system providing an IPTV service, where an IPTV service is a TV service in which LTV content (e.g., broadcast or multicast LTV content) is delivered using the architecture and networking schemes of the IP suite over a packet-switched network infrastructure, e.g., the Internet and broadband Internet access networks instead of being delivered through traditional radio frequency broadcast, satellite signal, or Cable TV (CATV) formats.

Set-Top Box (STB): As used herein, a STB is a device that receives a signal containing content for one or more LTV channels from one or more service providers and consumes (e.g., renders and/or records) content on at least one of the LTV channels. A STB may be a stand-alone device or its functionality may be incorporated into another device such as, e.g., a TV set.

Dual-Mode STB: As used herein, a dual-mode STB is a STB capable of operating in both a DTH satellite mode in which the dual-mode STB consumes (e.g., renders and/or records) LTV content from a DTH satellite system and a IPTV mode in which the dual-mode STB consumes (e.g., renders and/or records) LTV content from an IPTV system.

Systems and methods are disclosed herein that mitigate interruptions in service for a DTH satellite system. In particular, systems and methods are disclosed herein for improving service availability for DTH satellite systems using IPTV as a fallback mechanism.

In this regard, FIG. 1 illustrates a hybrid TV system 10 that includes both a DTH satellite system 12, an IPTV system 14, and a dual-mode STB 16 according to some embodiments of the present disclosure. In general, the dual-mode STB 16 consumes LTV content from the DTH satellite system 12 when operating in a DTH satellite mode and consumes LTV content from the IPTV system 14 when operating in an IPTV mode. More specifically, the dual-mode STB 16 primarily operates in the DTH satellite mode and uses the IPTV mode to prevent or mitigate actual or predicted service interruptions due to, e.g., natural or man-made obstructions between a Low Noise Block (LNB) 18, which is attached to the satellite dish (not shown) at the user or consumer premises, and a geostationary satellite 20 transmitting the DTH satellite signal.

As illustrated, the hybrid TV system 10 includes a publisher headend 22. The publisher headend 22 distributes LTV content (i.e., an audio/video feed on a transport stream) for an LTV channel to various service provider headends. Here, those service provider headends include a DTH service provider headend 24 and an IPTV service provider headend 26. In a similar manner, other publisher headends (not shown) also distribute LTV content for respective LTV channels to the service provider headends 24 and 26. As an example, ESPN operates a publisher headend for its ESPN channel. The ESPN publisher headend distributes the LTV content (i.e., an audio/video feed on a transport stream) to various provider headends (e.g., a DirecTV headend, an AT&T U-Verse headend, or the like).

The DTH satellite system 12 operates to deliver the LTV content received from the publisher headend 22 to the end users (also referred to herein as consumers). More specifically, the DTH service provider headend 24 receives the LTV content for the LTV channel from the publisher headend 22. In addition, the DTH service provider headend 24 receives LTV content for many more LTV channels from respective publisher headends (not shown). The DTH service provider headend 24 feeds the LTV content for the LTV channel(s) to DTH service provider middleware 28. The DTH service provider middleware 28 feeds the LTV content for the LTV channel(s) to a ground base station 30 that transmits a satellite uplink signal containing a feed of the LTV content for the LTV channel(s) to the geostationary satellite 20. The geostationary satellite 20 transmits a satellite downlink signal containing the feed of the LTV content for the LTV channel(s). In the illustrated example, the geostationary satellite 20 transmits the LTV content for the LTV channel(s) on the satellite downlink signal using the Digital Video Broadcasting-Satellite-Second Generation (DVB-S2) digital TV broadcast standard. DVB-S2 is a digital television broadcast standard that has been designed as a successor for the popular DVB-S system. It was developed in 2003 by the DVB Project, an international industry consortium, and ratified by ETSI (EN 302307) in March 2005.

At the consumer premises, the LNB 18 is connected to the dual-mode STB 16 via a wired or wireless link. For example, the LNB 18 may be connected to the dual-mode STB 16 via a coaxial cable. The LNB 18 receives the downlink signal from the geostationary satellite 20, optionally processes the downlink signal (e.g., performs one or more signal processing operations such as, e.g., amplifying, filtering, and down-converting the downlink signal) and outputs the processed downlink signal to the dual-mode STB 16. When operating in the DTH satellite mode, the dual-mode STB 16 performs further processing of the processed downlink signal to consume the LTV content for one or more of the LTV channel(s). For example, the dual-mode STB 16 may have the capability to simultaneously receive and consume (i.e., render and/or record) up to N LTV channels. When rendering the LTV content for a LTV channel, the dual-mode STB 16 in this example provides the corresponding audio/video stream to, in this example, a TV set 32.

In a similar manner, the IPTV system 14 operates to deliver the LTV content received from the publisher headend 22 to the end-users/consumers. More specifically, the IPTV service provider headend 26 receives the LTV content for the LTV channel from the publisher headend 22. In addition, the IPTV service provider headend 26 receives LTV content for many more LTV channels from respective publisher headends (not shown). The IPTV service provider headend 26 feeds the LTV content for the LTV channel(s) to IPTV service provider middleware 34 and a Content Delivery Network (CDN) 36. IP connectivity between a broadband network 38 and the IPTV service provider middleware 34 provides signaling and the control plane for the IPTV service. IP connectivity between the broadband network 38 and the CDN 36 provides the data plane for the IPTV service. There is also IP connectivity between the dual-mode STB 16 and the broadband network 38 for both the control plane and the data plane of the IPTV service. As discussed below in detail, when operating in the IPTV mode, the dual-mode STB 16 uses an obtained IP address of the desired LTV channel to start receiving and consuming an IPTV stream of the LTV content on the desired LTV channel.

In some embodiments, the dual-mode STB 16 also communicates with a STB status reporting server(s) 40 and/or a meteorological data central server(s) 42 via the broadband network 38. As discussed below, the STB status reporting server(s) 40 collects status information for many STBs, including the dual-mode STB 16. This status information includes information related to the status of the DTH satellite service at those STBs. More specifically, as an example, this status information may include receive signal strength measurements for the satellite downlink signal at the respective STBs or at the associated LNBs 18. In some embodiments, the STB status reporting server(s) 40 provides information to the dual-mode STB 16 regarding the status of other STBs in the same geographical region and/or provides instructions to the dual-mode STB 16 as to when to switch between the DTH satellite mode and the IPTV mode based on the status information collected from other STBs in the same geographical region. In some embodiments, the dual-mode STB 16 obtains meteorological information from the meteorological data central server(s) 42 and uses this information to determine or predict an imminent interruption in the DTH satellite service.

Figure 2:
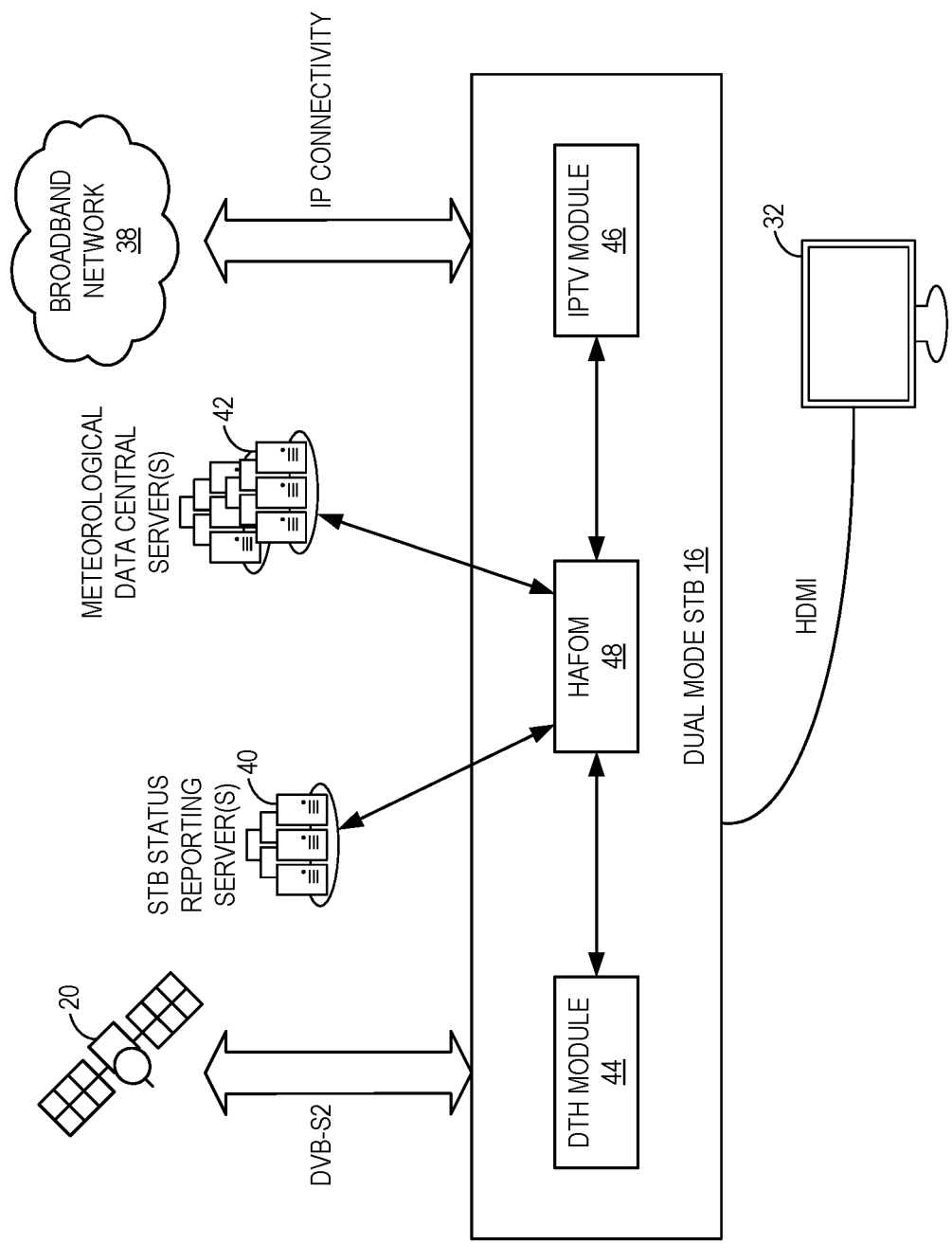
FIG. 2 illustrate a dual-mode Set-Top Box (STB) according to some embodiments of the present disclosure.

FIG. 2 illustrates the dual-mode STB 16 in more detail according to some embodiments of the present disclosure. As illustrated, the dual-mode STB 16 includes a DTH module 44, a IPTV module 46, and a High Availability Fail-Over Module (HAFOM) 48, each of which is implemented in hardware (e.g., circuitry including analog and/or digital circuitry such as, for example, amplifiers, filters, mixers, Analog-to-Digital (A/D) converters, one or more digital processors such as Central Processing Units (CPUs), Application Specific Integrated Circuits (ASICs), Field Programmable Gate Arrays (FPGAs), or the like, memory, connectors, and/or the like) or a combination of hardware and software. The DTH module 44 includes hardware or a combination of hardware and software that operates to receive the processed downlink signal from the DTH satellite system 12 and, when the dual-mode STB 16 is operating in the DTH satellite mode, process the received signal to consume LTV content on one or more LTV channels contained in the received signal. The IPTV module 46 includes hardware or a combination of hardware and software that, when the dual-mode STB 16 operates in the IPTV mode, starts receiving and consuming an IPTV stream(s) for a desired LTV channel(s) from the IPTV system 14. The HAFOM 48 includes hardware or a combination of hardware and software that operates to control the mode of operation of the dual-mode STB 16. In particular, as discussed below, the HAFOM 48 controls the dual-mode STB 16 to switch from the DTH satellite mode to the IPTV mode when one or more predefined conditions are met and/or when an instruction is received from the STB status reporting server(s) 40, depending on the particular embodiment.

Figure 3:
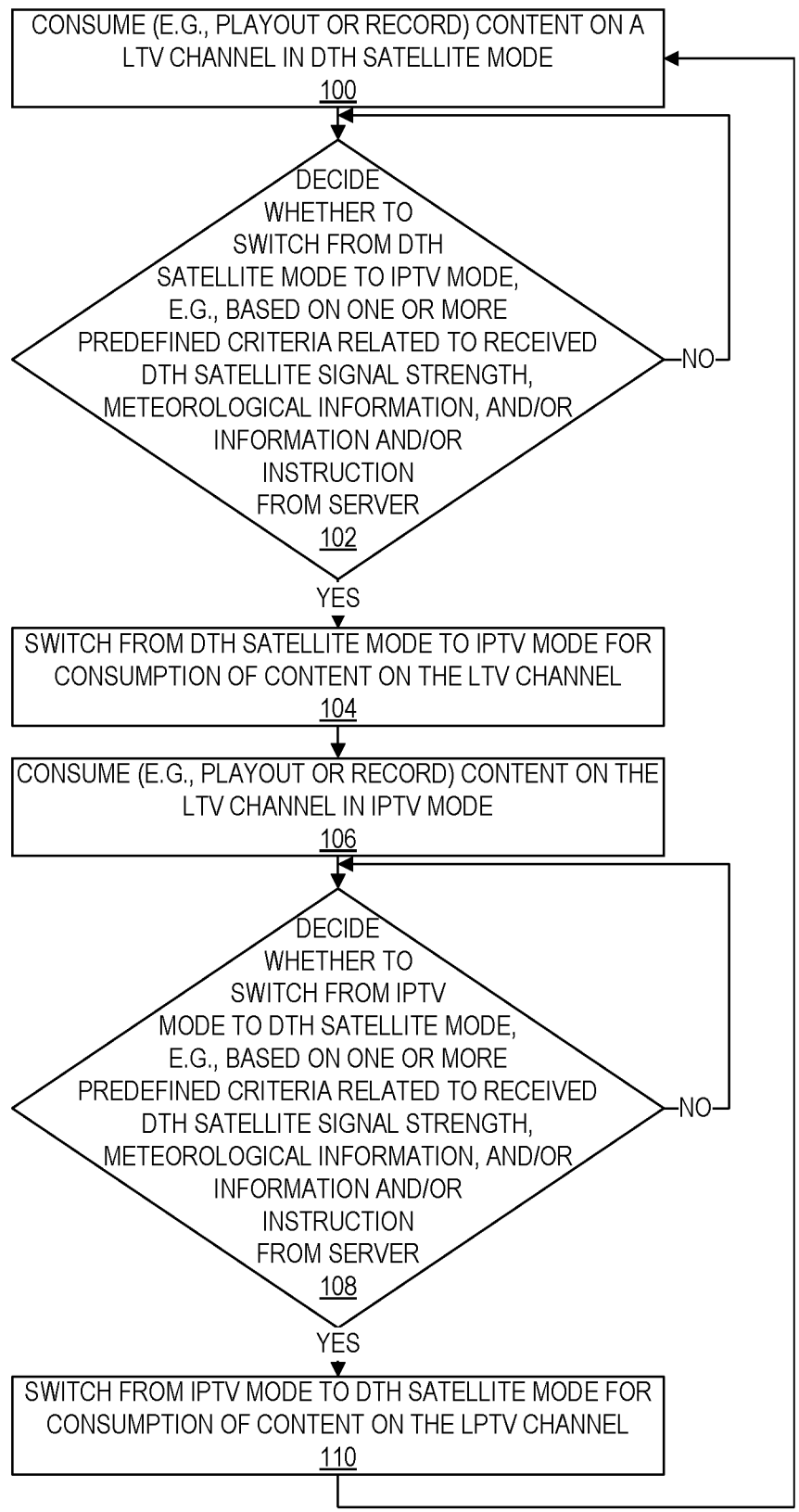
FIG. 3 is a flow chart that illustrates the operation of the dual-mode STB according to some embodiments of the present disclosure.

FIG. 3 is a flow chart that illustrates the operation of the dual-mode STB 16 according to some embodiments of the present disclosure. As illustrated, the dual-mode STB 16 initially consumes content on an LTV channel in the DTH satellite mode (step 100). For example, the dual-mode STB 16 may render the content and output the corresponding audio/video stream to the connected TV set 32 via, e.g., a High Definition Multimedia Interface (HDMI) cable. As another example, the dual-mode STB 16 may provide Digital Video Recorder (DVR) functionality and may consume the content on the LTV channel by recording the content.

While consuming the content on the LTV channel in the DTH satellite mode, the dual-mode STB 16, and in particular the HAFOM 48 of the dual-mode STB 16, decides whether to switch from the DTH satellite mode to the IPTV mode (step 102). In other words, the dual-mode STB 16 decides whether it should fall back to IPTV mode. This decision may be made autonomously based on any suitable information and criteria or may be made as a result of an explicit instruction from, e.g., the STB status reporting server(s) 40 or made based on an instruction received from a remote server. Note that the decision to switch to IPTV mode need not be made only when DTH satellite signal loss is absolute. Rather, the decision to switch to the IPTV mode is preferably made before consumption of the content of the LTV channel by the dual-mode STB 16 is compromised. More specifically, in some embodiments, the decision is made based on:

one or more predefined criteria related to a received signal strength of the downlink signal from the DTH satellite system 12 (which is also referred to herein as the DTH satellite signal) at the dual-mode STB 16, meteorological information obtained by the dual-mode STB 16 from, e.g., the meteorological data central server(s) 42, and/or an instruction from a server such as the STB status reporting server(s) 40.

Note that any criteria or conditions used by the dual-mode STB 16 for the decision may be hard-coded within the dual-mode STB 16, configured by the operator of the DTH satellite system 12 and provided to the dual-mode STB 16, or the like. For example, some or all of this information may be sent to the dual-mode STB 16 in Electronic Program Guide (EPG) metadata.

In one example, the dual-mode STB 16 monitors the received signal strength of the DTH satellite signal and decides to switch to the IPTV mode if the received signal strength of DTH satellite signal falls below a predefined threshold (e.g., −60 decibel-milliwatts (dBm)). Importantly, this predefined threshold is preferably set such that the dual-mode STB 16 will decide to switch to the IPTV mode before an actual interruption in service (i.e., before there is an actual loss of signal from the DTH satellite system 12). Further, the threshold may be configured by, e.g., the operator of the DTH satellite system 12 and provided to the dual-mode STB 16. In another example, the dual-mode STB 16 monitors the received signal strength of the DTH satellite signal and decides to switch to the IPTV mode if the received signal strength decreases at a rate of change that is more than a predefined threshold. For instance, a rate of change threshold may be set as X decibels over Y seconds, and the dual-mode STB 16 may decide to switch to the IPTV mode if the received signal strength of the DTH satellite signal decreases at a rate of change that is greater than or equal to X decibels over Y seconds.

In one example, the dual-mode STB 16 obtains meteorological information for a geographic region in which it is located from the meteorological data central server(s) 42 and decides to switch to the IPTV mode if the obtained meteorological information satisfies one or more predefined criteria that, if satisfied, are indicative of a predicted imminent interruption in the DTH satellite service at the dual-mode STB 16. For instance, if heavy precipitation or dense cloud coverage is moving on a trajectory that will hinder the line of sight between the LNB 18 of the dual-mode STB 16 and the satellite 20, then the dual-mode STB 16 will decide to switch to the IPTV mode.

In yet another example, the dual-mode STB 16 obtains information related to the status of other STBs in the same geographic region of the dual-mode STB 16 and decides whether to switch to the IPTV mode based on the obtained information. For example, the information may include an indication of the status of other STBs and the geographic locations of those STBs. Note that, as used herein, the geographic location of a STB is more precisely the geographic location of the LNB connected to the STB. Thus, as used herein, the location of a STB is to be understood as the location of the LNB connected to the STB unless otherwise indicated. The dual-mode STB 16 may then compare this information to one or more predefined criteria to decide whether to switch to the IPTV mode. For example, the one or more predefined criteria may include a criterion to switch to the IPTV mode if a threshold number of STBs within a defined distance from the location of the dual-mode STB 16 (or more precisely if a threshold number of STBs with LNBs within a defined distance from the location of the LNB 18 of the dual-mode STB 16) have a received strength of signal for the DTH satellite signal that is less than a predefined threshold.

In yet another example, the dual-mode STB 16 receives an instruction to switch to the IPTV mode from, e.g., the STB status reporting server(s) 40 and decides to switch to the IPTV mode upon receiving the instruction.

If the dual-mode STB 16 decides not to switch to the IPTV mode, then the dual-mode STB 16 returns to step 102 to, e.g., periodically or otherwise repeat the decision as to whether to switch to the IPTV mode. Upon deciding to switch to the IPTV mode, the dual-mode STB 16 switches from the DTH satellite mode to the IPTV mode for consumption of content on the LTV channel (step 104). For example, upon the HAFOM 48 deciding to switch to the IPTV mode, the HAFOM 48 activates or otherwise triggers the IPTV module 46 to start receiving an IPTV stream for the LTV channel and start consuming content on the LTV channel received via the IPTV stream. Notably, an IP address(es) (e.g., a IP multicast group address) or Uniform Resource Locator (URL) address utilized by the IPTV module 46 to start receiving the IPTV stream for the LTV channel (e.g., via an Internet Group Management Protocol (IGMP) JOIN or Hypertext Transfer Protocol (HTTP) GET) may be obtained by the dual-mode STB 16 in any suitable manner. For example, the IP address for the IPTV stream for the LTV channel may be included in an enhanced EPG obtained by the dual-mode STB 16 from, e.g., the DTH satellite system 12. In addition, the HAFOM 48 deactivates the DTH module 44 or otherwise causes the DTH module 44 to stop consuming content on the LTV channel received from the DTH satellite system 12. Note that the DTH module 44 may not be entirely deactivated. For example, the DTH module 44 would still be used to monitor the DTH signal to determine when to revert back from IPTV mode to the DTH satellite mode.

Further, as discussed below, it is likely that the content on the LTV channel delivered by the IPTV channel will not be time-aligned with the content on the LTV channel delivered by the DTH satellite system. For example, the content on the LTV channel delivered by the DTH satellite system may lag behind the content on the LTV channel delivered by the IPTV system since the DTH satellite system may have greater inherent delay than the IPTV system. Thus, in order to provide a seamless transition from the DTH satellite mode to the IPTV mode such that the transition does not degrade the user experience, the dual-mode STB 16 may take certain actions when switching modes. As an example, if the content on the LTV channel received via the IPTV system 14 leads the content on the LTV channel received via the DTH satellite system 12 by M seconds, then the dual-mode STB 16 caches the IPTV stream for at least M seconds prior to switching from the DTH satellite mode to the IPTV mode. Then, the dual-mode STB 16 selects a desired point in time within the content of the LTV channel (e.g., a particular frame) and switches from consumption of the content of the LTV channel to consumption of the cached content of the LTV channel at the desired point in time (e.g., switches from a frame of the content of the LTV channel received from the DTH satellite system 12 to the same frame of the content of the LTV channel received from the IPTV system 14). In this manner, if the dual-mode STB 16 is rendering the content of the LTV channel to the consumer on the TV set 32, there will be no interruption in the content rendered to the consumer (e.g., rendering will not skip ahead M seconds in the case where content delivered via the IPTV system 14 leads the content delivered via the DTH satellite system 12 by M seconds). If consuming the content of the LTV channel from cache, the IPTV module 46 may slightly increase the speed of consumption such that consumption catches up to the real-time delivery of the content.

Once the dual-mode STB 16 has switched to the IPTV mode, the dual-mode STB 16 consumes content on the LTV channel in the IPTV mode (step 106). While the dual-mode STB 16 is consuming content on the LTV channel in the IPTV mode, the dual-mode STB 16, and more specifically the HAFOM 48, decides whether to switch back to the DTH satellite mode (step 108). In general, as discussed above, the IPTV mode is used as a fallback for the DTH satellite mode. Thus, once fallback is no longer needed (i.e., when the received DTH satellite signal is stable or predicted to be stable), the dual-mode STB 16 switches back to the DTH satellite mode. The decision to switch back to the DTH satellite mode may be made by the dual-mode STB 16 autonomously based on any suitable information and criteria or may be made as a result of an explicit instruction from, e.g., the STB status reporting server(s) 40 or made based on an instruction received from a remote server. More specifically, in some embodiments, the decision is made based on:
- one or more predefined criteria related to a received signal strength of the downlink signal from the DTH satellite system 12 (which is also referred to herein as the DTH satellite signal) at the dual-mode STB 16,
- meteorological information obtained by the dual-mode STB 16 from, e.g., the meteorological data central server(s) 42, and/or
- an instruction from a server such as the STB status reporting server(s) 40.

Note that any criteria or conditions used by the dual-mode STB 16 for the decision may be hard-coded within the dual-mode STB 16, configured by the operator of the DTH satellite system 12 and provided to the dual-mode STB 16, or the like. For example, some or all of this information may be sent to the dual-mode STB 16 in EPG metadata.

In one example, while consuming content on the LTV channel received from the IPTV system 14, the dual-mode STB 16 monitors the received signal strength of the DTH satellite signal and decides to switch back to the DTH satellite mode if the received signal strength of DTH satellite signal increases above a predefined threshold (e.g., −57 dBm). Note that this threshold may or may not be the same as the threshold used to decide whether to switch from the DTH satellite mode to the IPTV mode. In order to prevent a ping-pong effect where the dual-mode STB 16 switches back and forth between DTH satellite mode and IPTV mode, a time constraint may be used in addition to the threshold. For instance, the dual-mode STB 16 may decide to switch back to the DTH satellite mode if the received signal strength of the DTH satellite signal stays above the predefined threshold for at least a defined amount of time (e.g., 3 minutes or 5 minutes). This predefined amount of time may be system configurable and, e.g., sent to the dual-mode STB 16 via EPG metadata.

In one example, the dual-mode STB 16 obtains meteorological information for a geographic region in which it is located from the meteorological data central server(s) 42 and decides to switch back to the DTH satellite mode if the obtained meteorological information satisfies one or more predefined criteria that, if satisfied, are indicative of no predicted imminent interruption in the DTH satellite service at the dual-mode STB 16. For instance, the meteorological information may include information indicating details of weather front movement and trajectory, cloud dissipation, and/or occurrences of precipitation in a geographic region in which the dual-mode STB 16 is located. Using this information, the dual-mode STB 16 can predict that there is no imminent loss of DTH satellite service for the dual-mode STB 16. For example, if the received signal strength of the DTH satellite signal stays above the predefined threshold for at least a defined amount of time and there is no prediction of imminent DTH loss of signal, then the dual-mode STB 16 will decide to switch to back to DTH mode.

In yet another example, the dual-mode STB 16 obtains information related to the status of other STBs in the same geographic region of the dual-mode STB 16 and decides whether to switch back to the DTH satellite mode based on the obtained information. For example, the information may include an indication of the status of other STBs and the geographic locations of those STBs or more precisely their respective LNBs. The dual-mode STB 16 may then compare this information to one or more predefined criteria to decide whether to switch back to the DTH satellite mode. For example, the one or more predefined criteria may include a criterion to switch back to the IPTV mode if less than a threshold number of STBs within a defined distance from the location of the dual-mode STB 16 (or more precisely if less than a threshold number of STBs with LNBs within a defined distance from the location of the LNB 18 of the dual-mode STB 16) have a received strength of signal for the DTH satellite signal that is less than a predefined threshold.

In yet another example, the dual-mode STB 16 receives an instruction to switch back to the DTH satellite mode from, e.g., the STB status reporting server(s) 40 and decides to switch to the IPTV mode upon receiving the instruction.

If the dual-mode STB 16 decides not to switch back to the DTH satellite mode, then the dual-mode STB 16 returns to step 108 to, e.g., periodically or otherwise repeat the decision as to whether to switch to the DTH satellite mode. Upon deciding to switch to the DTH satellite mode, the dual-mode STB 16 switches from the IPTV mode to the DTH satellite mode for consumption of content on the LTV channel (step 110). For example, upon the HAFOM 48 deciding to switch to the DTH satellite mode, the HAFOM 48 activates or otherwise triggers the DTH module 44 to start obtaining content on the LTV channel from the received DTH satellite signal and consuming that content (e.g., output the content to a DVR function (not shown) of the dual-mode STB 16 or output the content to the connected TV set 32). In addition, the HAFOM 48 deactivates the IPTV module 46 or otherwise causes the IPTV module 46 to stop receiving the IPTV stream for the LTV channel from the IPTV system 14. Note that, in some embodiments, the IPTV module 46 may not be fully deactivated. Rather, the IPTV module 46 may only be deactivated to the extent needed to stop receiving the IPTV stream for the LTV channel from the IPTV system 14.

Further, as discussed below, it is likely that the content on the LTV channel delivered by the IPTV channel will not be time-aligned with the content on the LTV channel delivered by the DTH satellite system 12. For example, the content on the LTV channel delivered by the DTH satellite system 12 may lag behind the content on the LTV channel delivered by the IPTV system 14 since the DTH satellite system 12 may have greater inherent delay than the IPTV system 14. Thus, in order to provide a seamless transition from the IPTV mode to the DTH mode such that the transition does not degrade the user experience, the dual-mode STB 16 may take certain actions when switching modes. As an example, if the content on the LTV channel received via the DTH satellite system 12 lags the content on the LTV channel received via the IPTV system 14 by M seconds, then the dual-mode STB 16 slows consumption of the content received via the IPTV stream such that this content is consumed more slowly than it is delivered. This slowed consumption can continue until the consumed content is time-aligned with the content received from the DTH satellite system 12 and, at that point, the dual-mode STB 16 switches consumption from the content received from the IPTV system 14 to the content received from the DTH satellite system 12. In this manner, a seamless transition is provided. Note that if caching of the content received from the IPTV system 14 was previously performed in order to provide a seamless transition from the DTH satellite mode to the IPTV mode and consumption of the content received from the IPTV system 14 was not sped up to reach real-time, then this caching of the content received from the IPTV system 14 enables a seamless transition back to the DTH satellite system 12 without the need to slow down consumption of the content received from the IPTV system 14 as described in the example above. This is because the caching resulted in a delay of M seconds between receipt and consumption of the content received from the IPTV system 14. Then, when switching back to the DTH satellite mode, the cached content received from the IPTV system 14 is already aligned with the content received from the DTH satellite system 12 and, as such, no further actions need to be performed in order to provide a seamless transition back to DTH satellite mode.

Once the dual-mode STB 16 has switched to the DTH satellite mode, the process returns to step 100 and is repeated. The process of FIG. 3 enables the dual-mode STB 16 to use the ITPV service as a fallback mechanism for the DTH satellite service and thereby mitigate or prevent service interruptions.

Figure 4A:
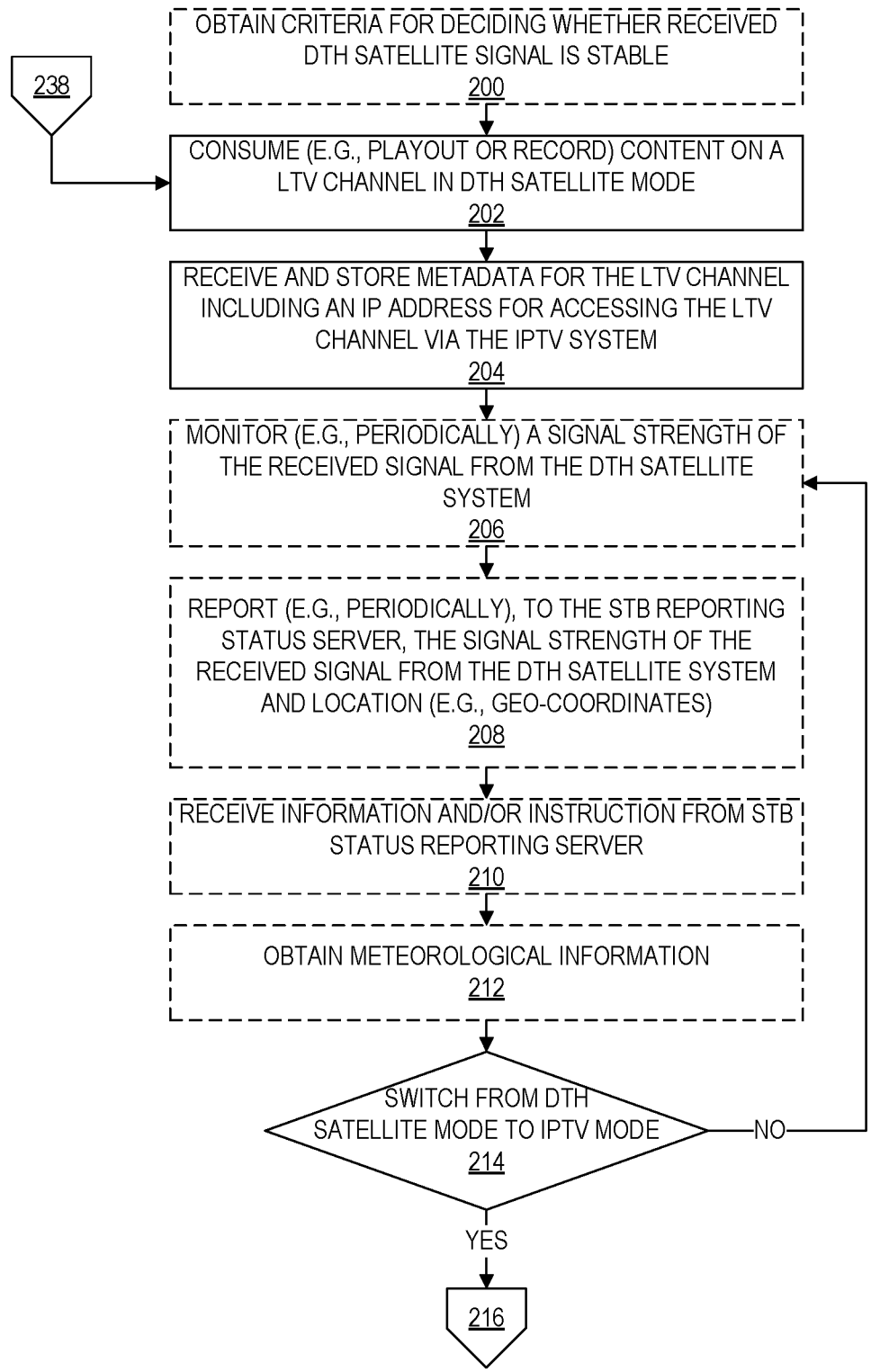
FIGS. 4A through 4C illustrate the operation of the dual-mode STB in more detail according to some embodiments of the present disclosure.
Figure 4B:
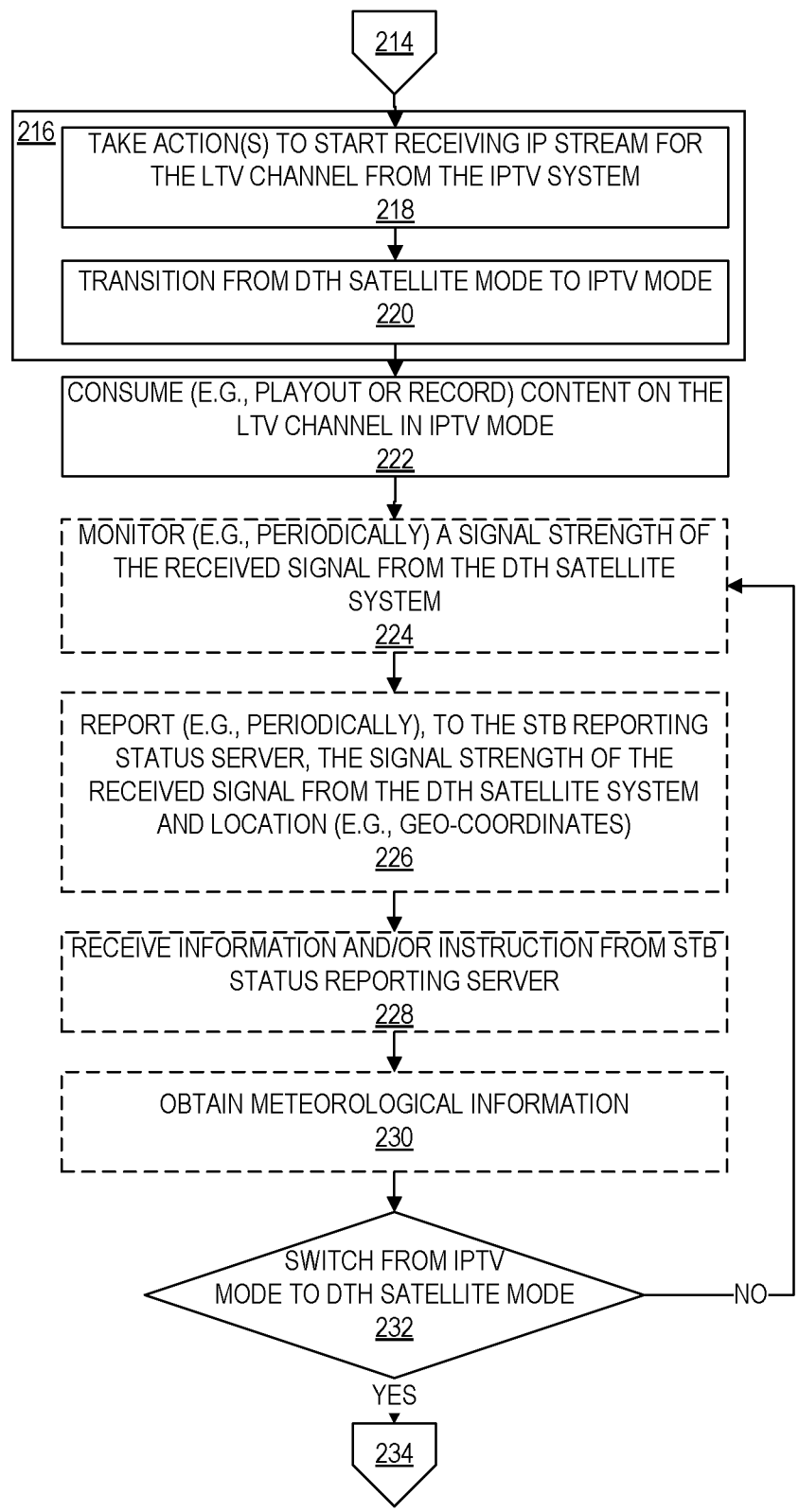
Figure 4C:
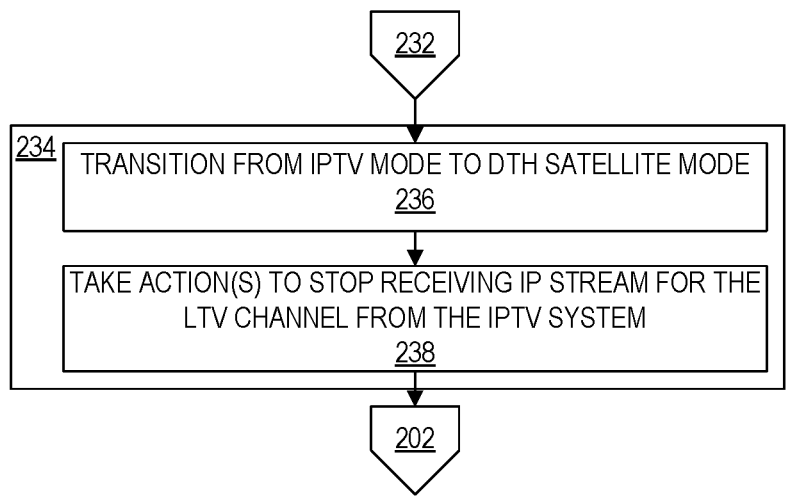

FIGS. 4A through 4C illustrate the operation of the dual-mode STB 16 in more detail according to some embodiments of the present disclosure. Note that optional steps are illustrated as dashed boxes. As illustrated, the dual-mode STB 16, and in particular the HAFOM 48, obtains one or more criteria for deciding whether the received DTH satellite signal is stable (step 200). The one or more criteria may be included in EPG metadata received from, e.g., the DTH satellite system 12. The dual-mode STB 16 consumes content on a LTV channel in the DTH satellite mode (step 202). For example, the dual-mode STB 16 may render the content and output the corresponding audio/video stream to the connected TV set 32 via, e.g., a HDMI cable. As another example, the dual-mode STB 16 may provide DVR functionality and may consume the content on the LTV channel by recording the content.

While operating in the DTH satellite mode, the dual-mode STB 16, and in particular the HAFOM 48 of the dual-mode STB 16, receives and stores metadata for the LTV channel including an IP address for accessing the LTV channel via the IPTV system 14 (step 204). This metadata is, in some embodiments, enriched EPG metadata. Further, in some embodiments, the received DTH satellite signal includes content for multiple LTV channels, and the metadata includes IP addresses for some for all of the LTV channels that enable the dual-mode STB 16 to alternatively obtain the content for those LTV channels from the IPTV system 14, or possibly one or more IPTV systems 14, using the respective IP addresses. The metadata may be embedded in the DTH satellite signal (e.g., in the DVB-S2 broadcast) or may be retrieved from, e.g., the IPTV service provider middleware 34. The IP address for the LTV channel may be in the form of, e.g., an IGMP multicast address or a URL address for HTTP Live Streaming (HLS) streaming.

Optionally, the dual-mode STB 16, and in particular the HAFOM 48, monitors (e.g., periodically or otherwise) a received signal strength of the DTH satellite signal (step 206). The received signal strength is the received signal strength at the LNB 18 connected to the dual-mode STB 16. Optionally, the dual-mode STB 16 reports (e.g., periodically) the received signal strength of the DTH satellite signal to the STB status reporting server(s) 40 together with a geographic location of the LNB 18 connected to dual-mode STB 16 (step 208). The geographic location may be expressed in any suitable manner such as, for example, geo-coordinates, street address, or the like. Note that the frequency at which the dual-mode STB 16 monitors the received signal strength and reports the received signal strength may be the same or different. For example, the dual-mode STB 16 may sample the received signal strength once a minute but report the samples of the received signal strength to the STB status reporting server(s) 40 once every 10 minutes.

Optionally, the dual-mode STB 16, and in particular the HAFOM 48, receives status information and/or an instruction to switch to the IPTV mode from the STB status reporting server(s) 40 (step 210). The status information is the status information or information derived from the status information received from other STBs. For example, the information may include the status (e.g., received DTH signal strength) and geographic locations of a number of STBs near the dual-mode STB 16. Again, as used herein, the geographic location of a STB is more precisely the geographic location of the LNB connected to the STB.

Optionally, the dual-mode STB 16, and in particular the HAFOM 48, obtains meteorological information for a geographic region in which the dual-mode STB 16 is located from the meteorological data central server(s) 42 (step 212). Note that the frequency at which the dual-mode STB 16 obtains the meteorological information may be the same or different than that at which the dual-mode STB 16 monitors the received signal strength and reports the received signal strength may be the same or different. For example, the dual-mode STB 16 may sample the received signal strength once a minute, report the samples of the received signal strength to the STB status reporting server(s) 40 once every 10 minutes, and obtain meteorological information, e.g., once every 15 minutes.

The dual-mode STB 16, and in particular the HAFOM 48, decides whether to switch from the DTH satellite mode to the IPTV mode (step 214). In this embodiment, the decision as to whether to switch to the IPTV mode is based on any one or more of the following:

The received signal strength of the received DTH satellite signal as compared to the criteria obtained in step 200. As an example, the criteria may include a threshold such that the decision is made to switch to the IPTV mode if the received signal strength of the DTH satellite signal falls below the threshold. As another example, the criteria may include a threshold rate of change such that the decision is made to switch to the IPTV mode if a rate at which the received signal strength of the DTH satellite signal decreases is greater than the threshold rate of change. As another example, if the received signal strength is trending downward, then the decision is made to switch to the IPTV mode.

Information received from the STB status reporting server(s) 40. This information may be used by the dual-mode STB 16, and in particular the HAFOM 48, to predict an imminent loss in received signal strength for the DTH satellite signal or an imminent interruption in the DTH satellite service at the dual-mode STB 16. In one example, the dual-mode STB 16 obtains information related to the status of other STBs in the same geographic region of the dual-mode STB 16 and decides whether to switch to the IPTV mode based on the obtained information. For example, the information may include an indication of the status of other STBs and the geographic locations of the LNBs of those STBs. The dual-mode STB 16 may then compare this information to one or more predefined criteria to decide whether to switch to the IPTV mode. For example, the one or more predefined criteria may include a criterion to switch to the IPTV mode if a threshold number of STBs having LNBs within a defined distance from the location of the LNB 18 connected to the dual-mode STB 16 have a received strength of signal for the DTH satellite signal that is less than a predefined threshold.

An instruction received from the STB status reporting server(s) 40. In one example, the dual-mode STB 16 receives an instruction to switch to the IPTV mode from, e.g., the STB status reporting server(s) 40 and decides to switch to the IPTV mode upon receiving the instruction.

Meteorological information obtained from the meteorological data central server(s) 42. Meteorological information can be used by the dual-mode STB 16, and in particular the HAFOM 48, to predict an imminent loss of DTH signal strength or an imminent interruption in the DTH satellite service at the dual-mode STB 16. In one example, the dual-mode STB 16 obtains meteorological information for a geographic region in which it is located from the meteorological data central server(s) 42 and decides to switch to the IPTV mode if the obtained meteorological information satisfies one or more predefined criteria that, if satisfied, are indicative of a predicted imminent interruption in the DTH satellite service at the dual-mode STB 16.

Note that any criteria or conditions used by the dual-mode STB 16 for the decision may be hard-coded within the dual-mode STB 16, configured by the operator of the DTH satellite system 12 and provided to the dual-mode STB 16, or the like. For example, some or all of this information may be sent to the dual-mode STB 16 in EPG metadata.

If the dual-mode STB 16 decides not to switch to the IPTV mode, then the dual-mode STB 16 returns to, in this example, step 206. Upon deciding to switch to the IPTV mode, the dual-mode STB 16 switches from the DTH satellite mode to the IPTV mode for consumption of content on the LTV channel (step 216). In other words, the HAFOM 48 causes the dual-mode STB 16 to switch from the DTH satellite mode to the IPTV mode. For example, upon the HAFOM 48 deciding to switch to the IPTV mode, the HAFOM 48 takes one or more actions to cause the IPTV module 46 to start receiving an IPTV stream for the LTV channel from the IPTV system 14 (step 218). Notably, an IP address for the IPTV stream is obtained, e.g., from the EPG metadata for the LTV channel currently being consumed. The action(s) taken to cause the IPTV module 46 to start receiving the IPTV stream for the LTV channel depend on the particular technology used by the CDN 36. As one example, the one or more actions may include causing the IPTV module 46 to initiate an IGMP JOIN using the IP address provided for the LTV channel to "tune" to the IPTV stream for the LTV channel or causing the IPTV module 48 to initiate an HTTP GET using the IP address provided for the LTV channel to retrieve an HLS stream for the LTV channel.

Once the dual-mode STB 16, and in particular the IPTV module 46, starts receiving the IPTV stream for the LTV channel from the IPTV system 14, the dual-mode STB 16 transitions from the DTH satellite mode to the IPTV mode (step 220). For example, the HAFOM 48 may deactivate the DTH module 44 and control the dual-mode STB 16 such that the dual-mode STB 16 starts consuming content of the LTV channel received via the IPTV module 46 rather than the DTH module 44. Note that the DTH module 44 may not be entirely deactivated. For example, the DTH module 44 would still be used to monitor the DTH signal to determine when to revert back from IPTV mode to the DTH satellite mode.

Further, it is likely that the content on the LTV channel delivered by the IPTV channel will not be time-aligned with the content on the LTV channel delivered by the DTH satellite system. For example, the content on the LTV channel delivered by the DTH satellite system may lag behind the content on the LTV channel delivered by the IPTV system since the DTH satellite system may have greater inherent delay than the IPTV system. Thus, in some embodiments, the transition performed in step 216 includes certain actions that provide a seamless transition from the DTH satellite mode to the IPTV mode such that the transition does not degrade the user experience. As an example, if the content on the LTV channel received via the IPTV system 14 leads the content on the LTV channel received via the DTH satellite system 12 by M seconds, then the HAFOM 48 causes the IPTV module 46 to caches the IPTV stream for at least M seconds prior to transitioning from the DTH satellite mode to the IPTV mode. Then, the HAFOM 48 selects a desired point in time within the content of the LTV channel (e.g., a particular frame) and causes the dual-mode STB 16 to transition to consumption of the cached content of the LTV channel at the desired point in time (e.g., switches from a frame of the content of the LTV channel received from the DTH satellite system 12 to the same frame of the content of the LTV channel received from the IPTV system 14). If consuming the content of the LTV channel from cache, the IPTV module 46 may slightly increase the speed of consumption such that consumption catches up to the real-time delivery of the content.

Thus, in some embodiments, once the IPTV stream for the LTV channel is secured by the dual-mode STB 16, the HAFOM 48 makes the decision as to exactly when the rendering of audio/video content should be switched from signal received from the DTH satellite system 12 to the signal received from the IPTV system 14. In some embodiments, in order to facilitate a smooth and seamless transition, the IPTV signal is cached by the dual-mode STB 16 (e.g., by the HAFOM 48). Note that because of inherent physical time delay associated with the uplink of downlink communication of a DTH satellite system 12, the DTH signal will typically lag behind any terrestrial broadcast system. In some embodiments, since both the DTH and IPTV signal carry the same Moving Picture Experts Group 2 (MPEG-2) Transport Stream (TS), the exact time/frame for the transition can be determined by the timing and offset information embedded in the TS. The transition should be done to minimize picture and sound jitter and to offer the best user experience for the end user. Optionally, in some embodiments, after as successful handover, the rendering of the MPEG-2 TS from the IPTV signal source can be adjusted ever so slightly (sped up) so as to catchup to the actual real time stream from the IPTV signal source.

Once the dual-mode STB 16 has switched to the IPTV mode, the dual-mode STB 16 consumes content on the LTV channel in the IPTV mode (step 222). Optionally, while the dual-mode STB 16 is consuming content on the LTV channel in the IPTV mode, the dual-mode STB 16, and in particular the HAFOM 48, monitors (e.g., periodically or otherwise) a received signal strength of the DTH satellite signal (step 224), reports (e.g., periodically) the received signal strength of the DTH satellite signal to the STB status reporting server(s) 40 together with the geographic location of the LNB 18 of the dual-mode STB 16, as discussed above (step 226), receives status information and/or an instruction to switch to the IPTV mode from the STB status reporting server(s) 40 (step 228), and/or obtains meteorological information for a geographic region in which the dual-mode STB 16 is located from the meteorological data central server(s) 42 (step 230), as discussed above.

The dual-mode STB 16, and more specifically the HAFOM 48, decides whether to switch back to the DTH satellite mode (step 232). In general, as discussed above, the IPTV mode is used as a fallback for the DTH satellite mode. Thus, once fallback is no longer needed (i.e., when the received DTH satellite signal is stable or predicted to be stable), the dual-mode STB 16 switches back to the DTH satellite mode. As discussed above, the decision to switch back to the DTH satellite mode may be made by the dual-mode STB 16 autonomously based on any suitable information and criteria or may be made as a result of an explicit instruction from, e.g., the STB status reporting server(s) 40 or made based on an instruction received from a remote server. More specifically, in some embodiments, the decision is made based on any one or more of the following:

The received signal strength of the received DTH satellite signal as compared to the criteria obtained in step 200. As an example, the criteria may include a threshold such that the decision is made to switch to the DTH satellite mode if the received signal strength of the DTH satellite signal increases above the threshold. Note that this threshold may or may not be the same as the threshold used to decide whether to switch from the DTH satellite mode to the IPTV mode. In order to prevent a ping-pong effect where the dual-mode STB 16 switches back and forth between DTH satellite mode and IPTV mode, a time constraint may be used in addition to the threshold. For instance, the dual-mode STB 16 may decide to switch back to the DTH satellite mode if the received signal strength of the DTH satellite signal stays above the predefined threshold for at least a defined amount of time (e.g., 3 minutes or 5 minutes). This predefined amount of time may be system configurable and, e.g., sent to the dual-mode STB 16 via EPG metadata.

Information received from the STB status reporting server(s) 40. This information may be used by the dual-mode STB 16, and in particular the HAFOM 48, to predict an imminent loss in received signal strength for the DTH satellite signal or an imminent interruption in the DTH satellite service at the dual-mode STB 16. In one example, the dual-mode STB 16 obtains information related to the status of other STBs in the same geographic region of the dual-mode STB 16 and decides whether to switch to the DTH satellite mode based on the obtained information. For example, the information may include an indication of the status of other STBs and the geographic locations of the LNBs of those STBs. The dual-mode STB 16 may then compare this information to one or more predefined criteria to decide whether to switch to the DTH satellite mode. For example, the one or more predefined criteria may include a criterion to switch to the DTH satellite mode if less than a threshold number of STBs having LNBs within a defined distance from the location of the LNB 18 of the dual-mode STB 16 have a received strength of signal for the DTH satellite signal that is less than a predefined threshold.

An instruction received from the STB status reporting server(s) 40. In one example, the dual-mode STB 16 receives an instruction to switch to the DTH satellite mode from, e.g., the STB status reporting server(s) 40 and decides to switch to the DTH satellite mode upon receiving the instruction.

Meteorological information obtained from the meteorological data central server(s) 42. Meteoroidal information can be used by the dual-mode STB 16, and in particular the HAFOM 48, to predict an imminent loss of DTH signal strength or an imminent interruption in the DTH satellite service at the dual-mode STB 16. In one example, the dual-mode STB 16 obtains meteorological information for a geographic region in which it is located from the meteorological data central server(s) 42 and decides to switch to the DTH satellite mode if the obtained meteorological information satisfies one or more predefined criteria that, if satisfied, are indicative of no predicted imminent interruption in the DTH satellite service at the dual-mode STB 16.

Note that any criteria or conditions used by the dual-mode STB 16 for the decision may be hard-coded within the dual-mode STB 16, configured by the operator of the DTH satellite system 12 and provided to the dual-mode STB 16, or the like. For example, some or all of this information may be sent to the dual-mode STB 16 in EPG metadata.

If the dual-mode STB 16 decides not to switch back to the DTH satellite mode, then the dual-mode STB 16 returns to step 224 in this example. Upon deciding to switch to the DTH satellite mode, the dual-mode STB 16 switches from the IPTV mode to the DTH satellite mode for consumption of content on the LTV channel (step 234). In other words, the HAFOM 48 causes the dual-mode STB 16 to switch from the IPTV mode to the DTH satellite mode. For example, upon the HAFOM 48 deciding to switch to the DTH satellite mode, the HAFOM 48 causes the dual-mode STB 18 to transition to the DTH satellite mode (step 236) and to take one or more actions to stop receiving the IPTV stream for the LTV channel (step 238). More specifically, the HAFOM 48 activates or otherwise triggers the DTH module 44 to start obtaining content on the LTV channel from the received DTH satellite signal and consuming that content (e.g., output the content to a DVR function (not shown) of the dual-mode STB 16 or output the content to the connected TV set 32). In addition, the HAFOM 48 deactivates the IPTV module 46 or otherwise causes the IPTV module 46 to stop receiving the IPTV stream for the LTV channel from the IPTV system 14. For example, if the IPTV stream is in the form of a multicast, the HAFOM 48 causes the IPTV module 46 to send an IGMP LEAVE message to stop receiving the multicast. If the IPTV stream is in the form of an HLS, the HAFOM 48 causes the IPTV module 48 to stop requesting the next time slice of the MPEG-2 TS.

Further, it is likely that the content on the LTV channel delivered by the IPTV channel will not be time-aligned with the content on the LTV channel delivered by the DTH satellite system 12. For example, the content on the LTV channel delivered by the DTH satellite system 12 may lag behind the content on the LTV channel delivered by the IPTV system 14 since the DTH satellite system 12 may have greater inherent delay than the IPTV system 14. Thus, in order to provide a seamless transition from the IPTV mode to the DTH mode in step 236, the dual-mode STB 16 may take certain actions when switching modes. As an example, if the content on the LTV channel received via the DTH satellite system 12 lags the content on the LTV channel received via the IPTV system 14 by M seconds, then the dual-mode STB 16 slows consumption of the content received via the IPTV stream such that this content is consumed more slowly than it is delivered. This slowed consumption can continue until the consumed content is time-aligned with the content received from the DTH satellite system 12 and, at that point, the dual-mode STB 16 switches consumption from the content received from the IPTV system 14 to the content received from the DTH satellite system 12. In this manner, a seamless transition is provided. Note that if caching of the content received from the IPTV system 14 was previously performed in order to provide a seamless transition from the DTH satellite mode to the IPTV mode and consumption of the content received from the IPTV system 14 was not sped up to reach real-time, then this caching of the content received from the IPTV system 14 enables a seamless transition back to the DTH satellite system 12 without the need to slow down consumption of the content received from the IPTV system 14 as described in the example above. This is because the caching resulted in a delay of M seconds between receipt and consumption of the content received from the IPTV system 14. Then, when switching back to the DTH satellite mode, the cached content received from the IPTV system 14 is already aligned with the content received from the DTH satellite system 12 and, as such, no further actions need to be performed in order to provide a seamless transition back to DTH satellite mode.

Once the dual-mode STB 16 has switched to the DTH satellite mode, the process returns to step 202 and is repeated. The process of FIGS. 4A through 4C enables the dual-mode STB 16 to use the ITPV service as a fallback mechanism for the DTH satellite service and thereby mitigate or prevent service interruptions.

Figure 5:
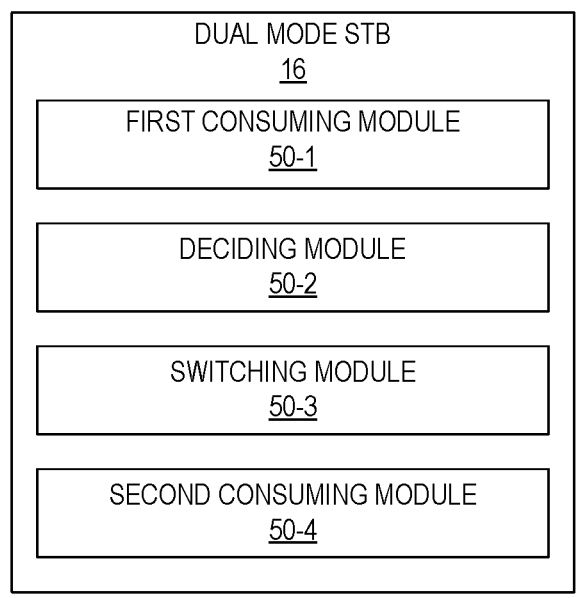
FIG. 5 illustrates a dual-mode STB according to some other embodiments of the present disclosure.

FIG. 5 illustrates the dual-mode STB 16 according to some embodiments of the present disclosure. In this embodiment, the dual-mode STB 16 includes a number of modules 50. In contrast to the modules 44, 46, and 48 of FIG. 2 which are implemented in hardware or a combination of hardware and software, the modules 50 of FIG. 5 are each implemented in software. In this example, the modules 50 include a first consuming module 50-1, a deciding module 50-2, a switching module 50-3, and a second consuming module 50-4. The first consuming module 50-1 is operable to consume content on a LTV channel in the DTH satellite mode. The deciding module 50-2 is operable to decide whether to switch from the DTH satellite mode to the IPTV mode before consumption of content on the LTV channel in the DTH satellite mode is compromised due to an actual or predicted reduction in received signal strength at the dual-mode STB 16 from the DTH satellite system 12. The switching module 50-3 is operable to, upon deciding to switch from the DTH satellite mode to the IPTV mode, switch from the DTH satellite mode to the IPTV mode. The second consuming module 50-4 is operable to, after switching from the DTH satellite mode to the IPTV mode, consume content on the LTV channel in the IPTV mode.

Figure 6:
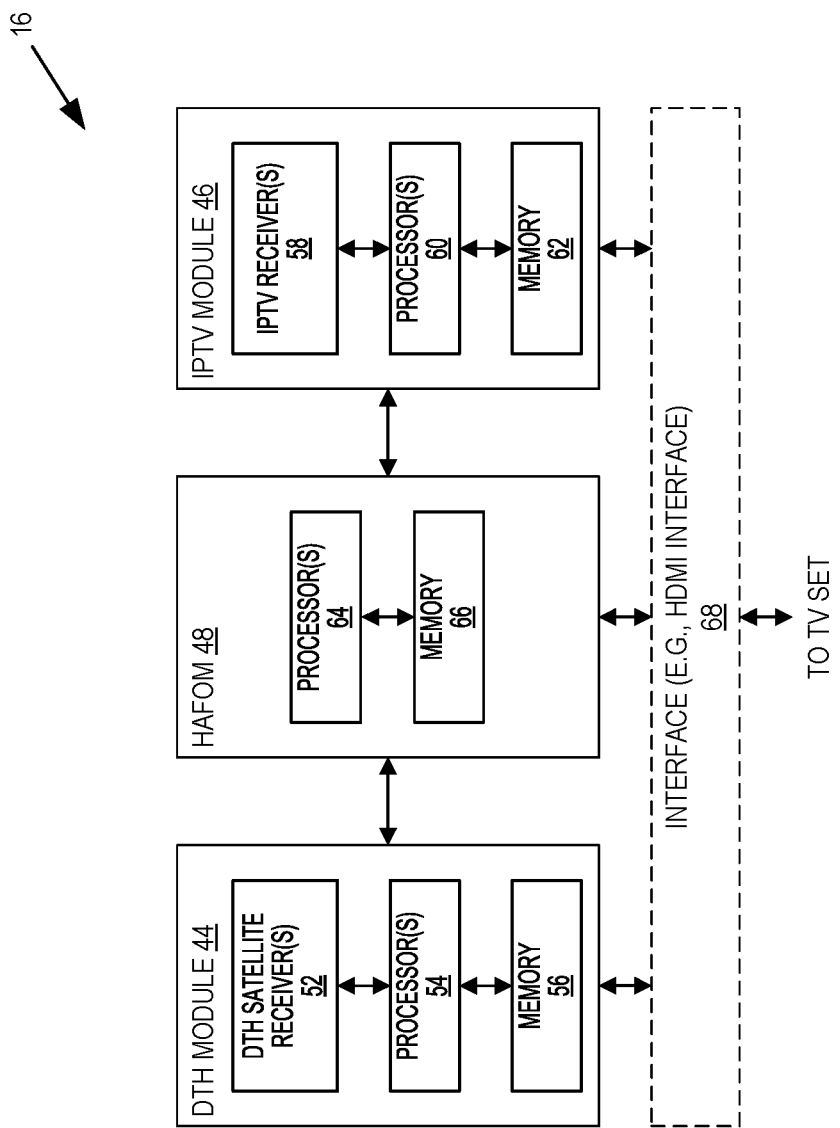
FIG. 6 illustrates a dual-mode STB according to some other embodiments of the present disclosure.

FIG. 6 illustrates the dual-mode STB 16 according to some embodiments of the present disclosure. FIG. 6 illustrates one implementation of the dual-mode STB 16 of FIG. 2. As illustrated, in this example, the DTH module 44 includes one or more DTH satellite receivers 52, one or more processors 54 (e.g., one or more CPUs, one or more ASICs, one or more FPGAs, one or more DSPs, and/or the like), and memory 56. The DTH satellite receiver(s) 52 includes analog and digital circuitry (e.g., amplifier(s), filter (s), mixer(s), ADC(s), and/or the like) that operate to receive the DTH signal from the LNB 18 and output a respective digital signal(s). The processor(s) 54 operate to process the digital signal(s) to consume (e.g., record and/or render) the LTV content for a selected LTV channel(s) when the dual-mode STB 16 is operating in the DTH satellite mode, as will be appreciated by one of ordinary skill in the art. In some embodiments, at least some of the functionality of the DTH module 44 described herein is implemented in software that is stored in the memory 56 and executed by the processor(s) 54.

In a similar manner, in this example, the IPTV module 46 includes one or more IPTV receivers 58, one or more processors 60 (e.g., one or more CPUs, one or more ASICs, one or more FPGAs, one or more DSPs, and/or the like), and memory 62. The IPTV receiver(s) 58 includes analog and digital circuitry (e.g., amplifier(s), filter(s), mixer(s), ADC (s), and/or the like) that operate to receive the IPTV signal from the LNB 18 and output a respective digital signal(s). The processor(s) 60 operate to process the digital signal(s) to consume (e.g., record and/or render) the LTV content for a selected LTV channel(s) when the dual-mode STB 16 is operating in the IPTV mode, as will be appreciated by one of ordinary skill in the art. In some embodiments, at least some of the functionality of the IPTV module 46 described herein is implemented in software that is stored in the memory 62 and executed by the processor(s) 60.

In this example, the HAFOM 48 includes one or more processors 64 (e.g., one or more CPUs, one or more ASICs, one or more FPGAs, one or more DSPs, and/or the like) and memory 66. In some embodiments, the functionality of the HAFOM 48 described herein is implemented in software that is stored in the memory 66 and executed by the processor(s) 64. In particular, when operating in the DTH satellite mode, the HAFOM 48 controls the DTH module 44 such that the dual-mode STB 16 consumes the LTV content on the desired LTV channel received from the DTH satellite system 12. For instance, the HAFOM 48 activates the DTH module 44 and controls an interface 68 such that the LTV content output by the DTH module 44 is output to, in this example, a TV set via the interface 68. Conversely, when operating in the IPTV mode, the HAFOM 48 controls the IPTV module 46 such that the dual-mode STB 16 consumes the LTV content on the desired LTV channel received from the IPTV system 14. For instance, the HAFOM 48 activates the IPTV module 46 and controls the interface 68 such that the LTV content output by the IPTV module 46 is output to, in this example, a TV set via the interface 68. The HAFOM 48 operates to intelligently switch the dual-mode STB 16 between the DTH satellite mode and the IPTV mode, as described above.

The following acronyms are used throughout this disclosure.

A/D Analog-to-Digital
    ASIC Application Specific Integrated Circuit
    CATV Cable Television
    CDN Content Delivery Network
    CPU Central Processing Unit
    dBm Decibel-Milliwatt
    DTH Direct-To-Home
    DVB-S2 Digital Video Broadcasting-Satellite-Second Generation DVR Digital Video Recorder
EPG Electronic Program Guide
FPGA Field Programmable Gate Array
HAFOM High-Availability Fail-Over Module
HDMI High Definition Multimedia Interface
HLS Hypertext Transfer Protocol Live Streaming
HTTP Hypertext Transfer Protocol
IGMP Internet Group Management Protocol
IP Internet Protocol
IPTV Internet Protocol Television
LNB Low Noise Block
LTV Linear Television
MPEG-2 Moving Picture Experts Group 2
nVoD Near Video on Demand
PPV Pay-Per-View
STB Set-Top Box
SVoD Subscription Video on Demand
TS Transport Stream
TV Television
TVoD Transactional Video on Demand
URL Uniform Resource Locator
VoD Video on Demand Those skilled in the art will recognize improvements and modifications to the embodiments of the present disclosure. All such improvements and modifications are considered within the scope of the concepts disclosed herein.

What is claimed is:

1. A method of operation of a dual-mode Set-Top Box (STB) that consumes content from a Direct-To-Home (DTH) satellite system when operating in a DTH satellite mode and consumes content from an Internet Protocol (IP) Television (IPTV) system when operating in an IPTV mode, the method comprising:
   consuming content on a Linear Television (LTV) channel in the DTH satellite mode;
   deciding whether to switch from the DTH satellite mode to the IPTV mode, before consumption of the content on the LTV channel in the DTH satellite mode is compromised, due to an actual or predicted reduction in received signal strength at the dual-mode STB from the DTH satellite system, wherein the deciding comprises deciding whether to switch from the DTH satellite mode to the IPTV mode:
      based on one or more criteria related to an actual received signal strength at the dual-mode STB from the DTH satellite system, the one or more criteria comprising a predefined threshold rate of change of the actual received signal strength, and
      when the actual received signal strength at the dual-mode STB from the DTH satellite system decreases at a rate that is greater than or equal to the predefined threshold rate of change of the actual received signal strength for a predefined amount of time;
   upon deciding to switch from the DTH satellite mode to the IPTV mode, switching from the DTH satellite mode to the IPTV mode; and
   after switching from the DTH satellite mode to the IPTV mode, receiving an IPTV stream for the LTV channel using an IP address and consuming the content on the LTV channel in the IPTV mode.

2. The method of claim 1, wherein the one or more criteria related to the actual received signal strength at the dual-mode STB from the DTH satellite system comprise a predefined threshold, and wherein deciding whether to switch from the DTH satellite mode to the IPTV mode based on the one or more criteria further comprises deciding to switch from the DTH satellite mode to the IPTV mode when the actual received signal strength at the dual-mode STB from the DTH satellite system is less than the predefined threshold.

3. The method of claim 1, wherein deciding whether to switch from the DTH satellite mode to the IPTV mode further comprises deciding whether to switch from the DTH satellite mode to the IPTV mode based on one or more criteria related to a predicted received signal strength at the dual-mode STB from the DTH satellite system.

4. The method of claim 1, wherein deciding whether to switch from the DTH satellite mode to the IPTV mode further comprises deciding whether to switch from the DTH satellite mode to the IPTV mode based on one or more criteria related to meteorological information for a geographic region in which the dual-mode STB is located.

5. The method of claim 1, further comprising receiving metadata for the LTV channel, the metadata comprising the IP address for accessing the LTV channel via the IPTV system, wherein switching from the DTH satellite mode to the IPTV mode comprises taking one or more actions to begin receiving the IPTV stream for the LTV channel from the IPTV system using the IP address.

6. The method of claim 5, wherein receiving the metadata comprises receiving the metadata as part of an enhanced electronic programming guide.

7. The method of claim 1, further comprising monitoring the actual received signal strength at the dual-mode STB from the DTH satellite system.

8. The method of claim 7, further comprising reporting the actual received signal strength at the dual-mode STB from the DTH satellite system and a geographic location of the dual-mode STB to a remote server.

9. The method of claim 8, wherein deciding whether to switch from the DTH satellite mode to the IPTV mode further comprises deciding whether to switch from the DTH satellite mode to the IPTV mode based on an instruction or information received from the remote server.

10. The method of claim 1, wherein switching from the DTH satellite mode to the IPTV mode comprises taking one or more actions to start receiving the IPTV stream for the LTV channel from the IPTV system.

11. The method of claim 10, wherein switching from the DTH satellite mode to the IPTV mode further comprises transitioning consumption of the content on the LTV channel from a received signal from the DTH satellite system to the IPTV stream for the LTV channel received from the IPTV system.

12. The method of claim 11, wherein the transitioning consumption of the content on the LTV channel from the received signal from the DTH satellite system to the IPTV stream for the LTV channel received from the IPTV system comprises transitioning consumption of content on the LTV channel from the received signal from the DTH satellite system to the IPTV stream for the LTV channel received from the IPTV system such that the transition of consumption of the content on the LTV channel is seamless.

13. The method of claim 11, wherein:
   the content on the LTV channel provided by the received signal from the DTH satellite system lags the content on the LTV channel provided by the IPTV stream; and
   the transitioning consumption of the content on the LTV channel from the received signal from the DTH satellite system to the IPTV stream for the LTV channel received from the IPTV system comprises:
      caching the IPTV stream; and
      transitioning consumption of the content on the LTV channel from a point in time in the content on the LTV channel provided by the received signal from the DTH satellite system to a corresponding point in time in the content on the LTV channel provided by the cached IPTV stream.

14. The method of claim 13, wherein the transitioning consumption of the content on the LTV channel from the received signal from the DTH satellite system to the IPTV stream for the LTV channel received from the IPTV system further comprises speeding up consumption of the content on the LTV channel provided by the cached IPTV stream until consumption catches up to the IPTV stream, after the transitioning consumption of the content on the LTV channel from the point in time in the content on the LTV channel provided by the received signal from the DTH satellite system to the corresponding point in time in the content on the LTV channel provided by the cached IPTV stream.

15. The method of claim 1, further comprising:
while consuming the content on the LTV channel in the IPTV mode, deciding whether to switch from the IPTV mode to the DTH satellite mode based on the received signal strength at the dual-mode STB from the DTH satellite system being greater than a predefined received signal strength threshold for at least a predefined amount of time;
upon deciding to switch from the IPTV mode to the DTH satellite mode, switching from the IPTV mode to the DTH satellite mode; and
after switching from the IPTV mode to the DTH satellite mode, consuming the content on the LTV channel in the DTH satellite mode.

16. The method of claim 15, wherein deciding whether to switch from the IPTV mode to the DTH satellite mode is further based on meteorological information for a geographic region in which the dual-mode STB is located.

17. The method of claim 15, wherein deciding whether to switch from the IPTV mode to the DTH satellite mode comprises deciding whether to switch from the IPTV mode to the DTH satellite mode further based on an instruction or information received from a remote server.

18. A dual-mode Set-Top Box (STB) that consumes content from a Direct-To-Home (DTH) satellite system when operating in a DTH satellite mode and consumes content from an Internet Protocol (IP) Television (IPTV) system when operating in an IPTV mode, the dual-mode STB adapted to:
consume content on a Linear Television (LTV) channel in the DTH satellite mode; decide whether to switch from the DTH satellite mode to the IPTV mode, before consumption of the content on the LTV channel in the DTH satellite mode is compromised, due to an actual or predicted reduction in received signal strength at the dual-mode STB from the DTH satellite system, wherein the dual-mode STB is adapted to decide whether to switch from the DTH satellite mode to the IPTV mode:
based on one or more criteria related to an actual received signal strength at the dual-mode STB from the DTH satellite system, the one or more criteria comprising a predefined threshold rate of change of the actual received signal strength, and
when the actual received signal strength at the dual-mode STB from the DTH satellite system decreases at a rate that is greater than or equal to the predefined threshold rate of change of the actual received signal strength for a predefined amount of time;
in response to a decision to switch from the DTH satellite mode to the IPTV mode, switch from the DTH satellite mode to the IPTV mode: and
after the switch from the DTH satellite mode to the IPTV mode, receive an IPTV stream for the LTV channel using an IP address and consume the content on the LTV channel in the IPTV mode.

19. A dual-mode Set-Top Box (STB) that consumes content from a Direct-To-Home (DTH) satellite system when operating in a DTH satellite mode and consumes content from an Internet Protocol (IP) Television (IPTV) system when operating in an IPTV mode, the dual-mode STB comprising:
at least one processor; and
a memory comprising instructions executable by the at least one processor whereby the dual-mode STB is operable to:
control the dual-mode STB to operate in the DTH satellite mode in which the dual-mode STB consumes content on a Linear Television (LTV) channel received from the DTH satellite system;
decide whether to switch the dual-mode STB from the DTH satellite mode to the IPTV mode, before consumption of the content on the LTV channel in the DTH satellite mode is compromised, due to an actual or predicted reduction in received signal strength at the dual-mode STB from the DTH satellite system, wherein the dual-mode STB is operable to decide whether to switch from the DTH satellite mode to the IPTV mode:
based on one or more criteria related to an actual received signal strength at the dual-mode STB from the DTH satellite system, the one or more criteria comprising a predefined threshold rate of change of the actual received signal strength, and
when the actual received signal strength at the dual-mode STB from the DTH satellite system decreases at a rate that is greater than or equal to the predefined threshold rate of change of the actual received signal strength for a predefined amount of time;
in response to a decision to switch the dual-mode STB from the DTH satellite mode to the IPTV mode, control the dual-mode STB to switch to the IPTV mode in which the dual-mode STB consumes the content on the LTV channel received from the IPTV system: and
after controlling the dual-mode STB to switch to the IPTV mode, control the dual-mode STB to receive an IPTV stream for the LTV channel using an IP address and consume the content on the LTV channel received from the IPTV system.

* * * * *